Dec. 30, 1947.  W. F. RIDGWAY  2,433,786
DRIVE MECHANISM FOR MACHINE TOOLS
Filed Oct. 25, 1944  3 Sheets-Sheet 1
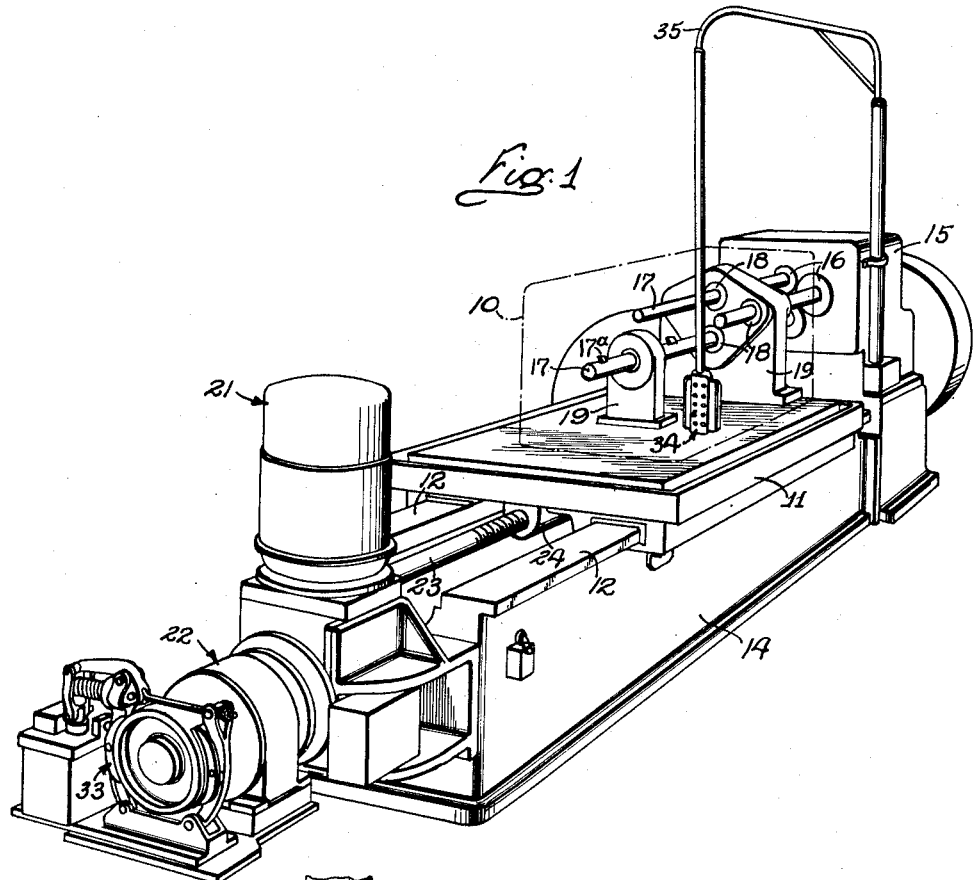
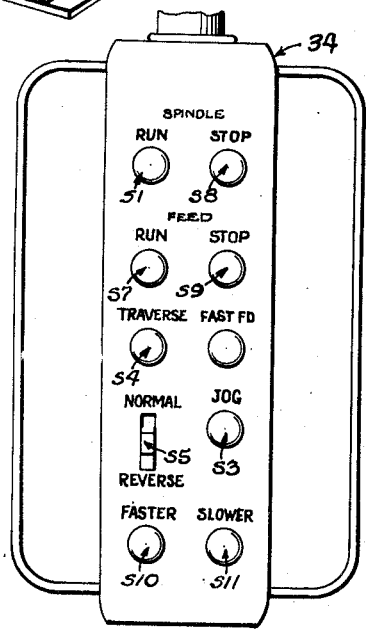
INVENTOR
William F. Ridgway
By Carlson, Pitzner, Hubbard & Wolfe
ATTORNEYS

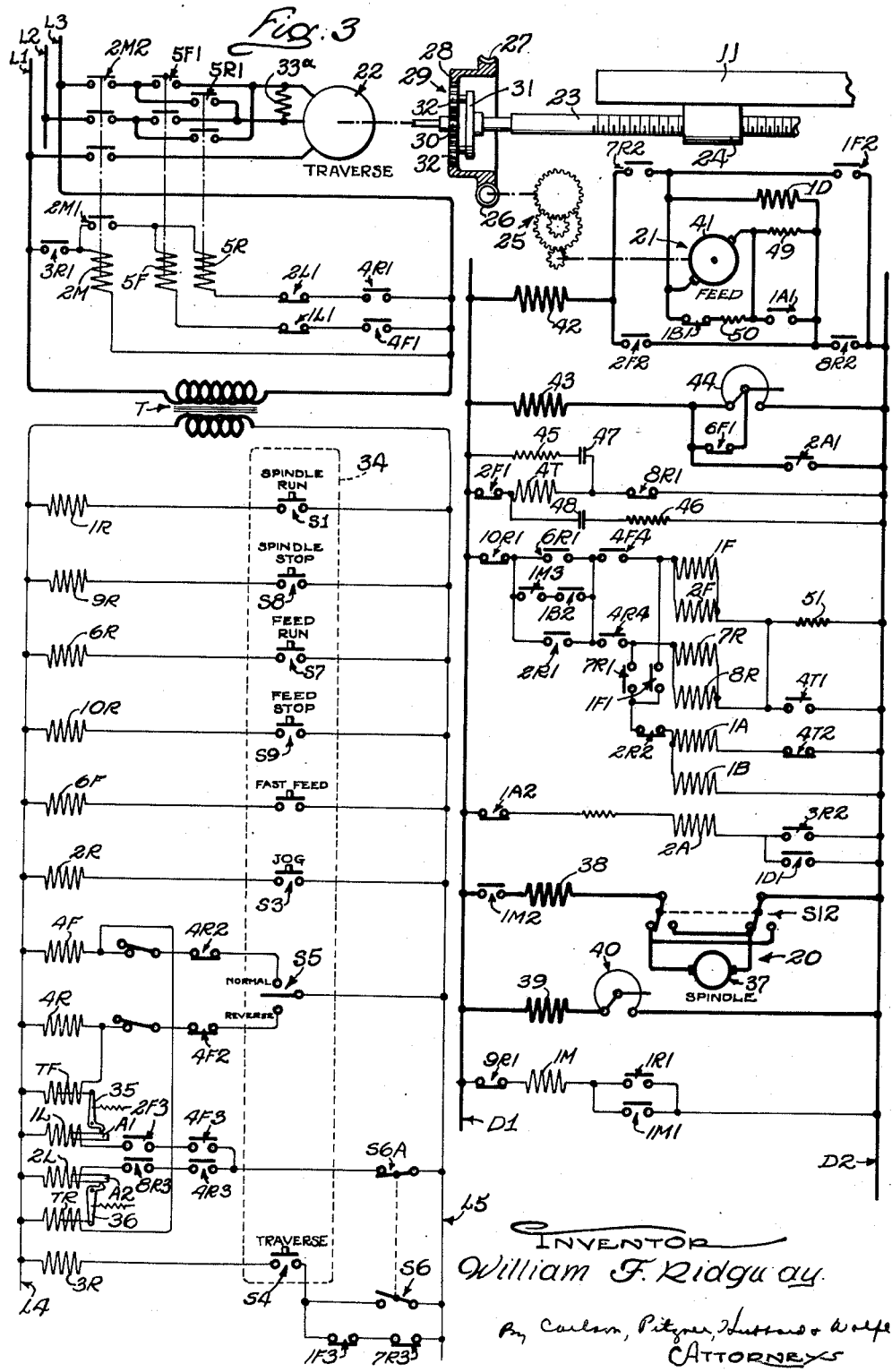

Patented Dec. 30, 1947

2,433,786

UNITED STATES PATENT OFFICE 2,433,786

DRIVE MECHANISM FOR MACHINE TOOLS

William F. Ridgway, Rockford, Ill., assignor to The Ingersoll Milling Machine Company, Rockford, Ill., a corporation of Illinois Application October 25, 1944, Serial No. 560,301

12 Claims. (Cl. 172—179)

The present invention pertains to a novel drive mechanism, and which is intended primarily for use in machine tools or the like, although it may also find utility in other fields.

The general object of the present invention is to provide a plural speed drive mechanism of such character that it cannot normally be operated at high speed, following low speed operation, save in a direction opposite to that at which the preceding low speed operation took place.

The automatic imposition of the operational sequence noted above affords a degree of safety of operation in many machine tools which has not heretofore been attained. More particularly, machine tools are commonly equipped with a reversible power drive of one sort or another, electric or hydraulic, which causes a relative approach movement of a cutting tool and work piece, followed by retreat of the same after cutting is completed. The set-up may be such that the requisite relative movement of tool and work is accomplished by translation of either the tool or work or both, the relativity of motion of the two with reference to each other being the important point. Frequently relative motion during actual cutting must be at a low or so-called "feed" speed since it may be possible to feed the cutting tool during such time at only a few thousandths of an inch per revolution of the same. Such being the case, the overall operating time is minimized by using a plural speed drive mechanism adapted to effect the initial approach of tool and work, as well as retreat after cutting, at a high or so-called "rapid traverse" speed. The very fact of availability of such high speed travel for the machine tool elements, although increasing machine efficiency, commensurately increases the possibilities of wrecking the machine and injuring the operator. Such danger is enhanced in no small degree by the widespread adoption in machine tools of pushbutton controls by means of which even heavy machine elements, driven with great power, can be started, stopped, speeded up, slowed down, etc., merely by pressing the appropriate ones of a row of finger-operated buttons. So much power, so readily brought into play, must be carefully safeguarded.

One potent danger present under the circumstances outlined is that an operator, having completed cutting of a work piece with a machine feeding slowly, will, in pursuance of an intention to restore the machine to starting position, press the "rapid traverse" button without having first operated the appropriate reversing button. In such case the machine, instead of rapidly reversing to starting position as intended, leaps ahead at high speed in the direction in which it was previously slowly feeding. Broken tools and smashed work will be the least of the consequences of such a simple mistake. It is such an eventuality that the present invention aims to prevent.

A more specific object of the invention is to afford a drive mechanism embodying a safety arrangement of the general character indicated and which is not disabled by a power failure in course of the cycle of machine operation.

Still another object is to provide a drive mechanism embodying a safety or interlock arrangement of the general character indicated which may be cut out of service when desired to accommodate "jump feeding" in which rapid traverse and feed must necessarily alternate in the same direction of motion, but with the cutting out of the interlock accomplished in such manner that it is impressed upon the operator that he is no longer afforded its protective safety.

Further objects and advantages of the invention will become apparent as the following description proceeds, taken in connection with the accompanying drawings, in which:

Figure 1 is a general perspective view of a horizontal boring machine equipped with a drive mechanism embodying the present invention.

Fig. 2 is an enlarged face view of the pushbutton control pendant included in the machine of Fig. 1.

Fig. 3 is a schematic wiring diagram of the electric control circuits for the machine of Fig. 1.

Figure 3A:
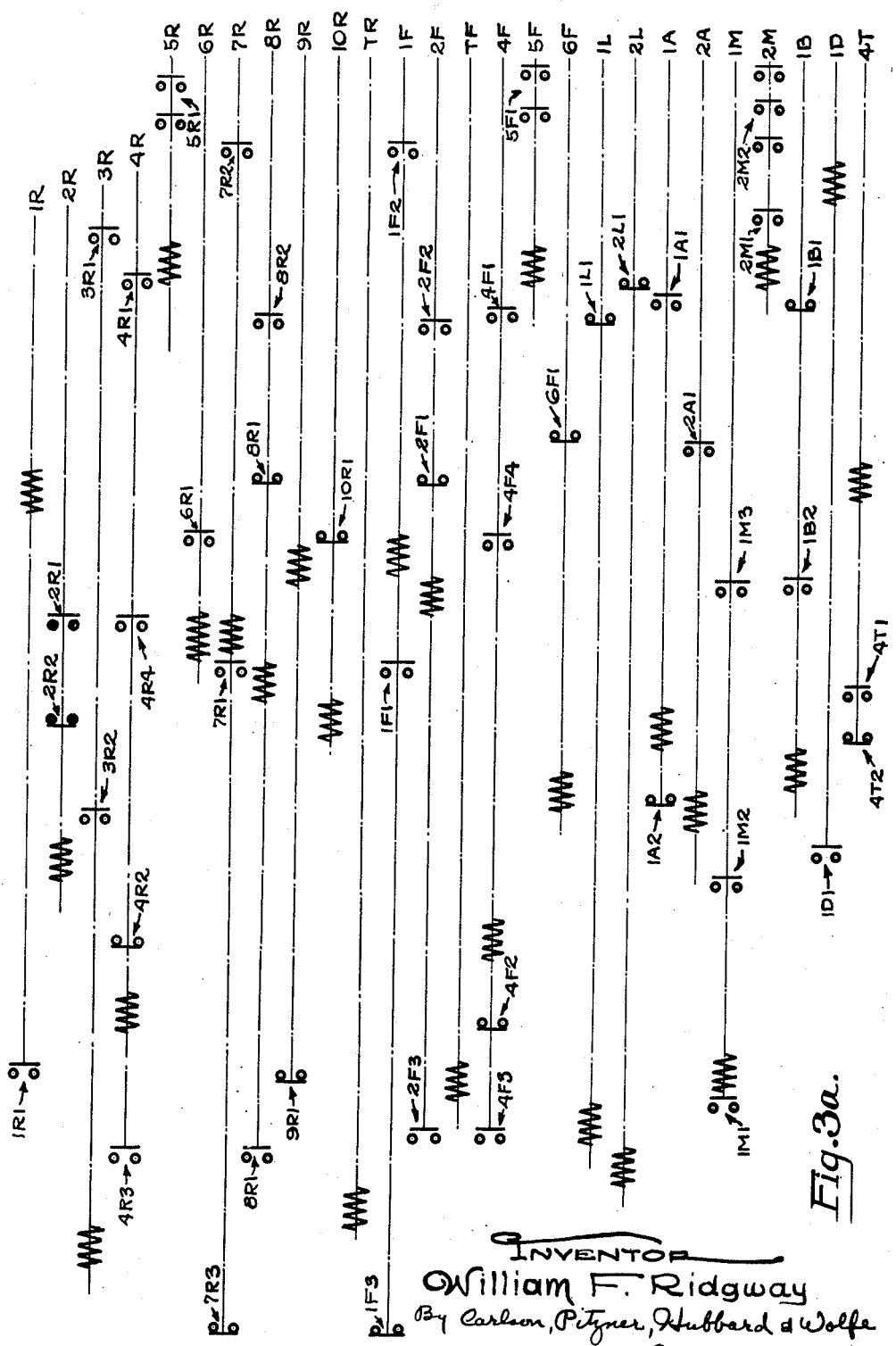
Fig. 3a is a key sheet for Fig. 3 showing the electromagnetic switches in spindle form with the contacts and coils arranged on the spindles in horizontal arrangement with the corresponding contacts and coils in the wiring diagram of Fig. 3.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the exemplary embodiment of the invention shown in the drawings, the invention has been illustrated and described herein as applied to a horizontal boring machine. It will be appreciated by those skilled in the art, however, that the present invention is applicable to an almost numberless variety of machine tools and of which that shown is but an example. The machine shown is, in its overall layout and construction, of familiar form and accordingly simply a brief identification of its principal structural elements will suffice, the present invention being concerned primarily with the drive mechanism and its controls.

In the illustrated machine the work piece, indicated in phantom at 10, is carried on a table 11 slidably mounted on ways 12 for horizontal endwise movement along the top of the machine bed 14. At the far end of the bed is an upright casing or headstock 15 housing the drive mechanism for revolving suitable tool spindles 16 and from which project boring bars 17. Such boring bars carry the usual radially projecting cutters 17a and their outboard portions are slidably journaled in pilot bearings 18 carried by suitably located pedestals 19 on the table 11. The work 10 is fed in a direction axially of the revolving boring bars 17 by translation of the table 11, the cutting tools being, in this instance, non-translatable. Under such circumstances the cutters 17a perform in the usual manner to bore out holes in the work to predetermined diameter. All of the several spindles 16 are revolved by a single spindle drive motor 20.

Any one of a variety of forms of reversible multi-speed power actuators may be employed for translating the table 11. In the present instance a pair of reversible electric motors are used, namely, a feed motor 21 and a rapid traverse motor 22. As indicated in Fig. 3, these motors 21, 22 are connected through suitable gearing to revolve a lead screw 23 threaded in a nut 24 fixed to the underside of the table 11. As illustrated, the feed motor 21 is connected through speed reduction gearing 25 to a worm 26 meshed with a worm gear 27 rigid with the ring gear 28 of a differential gearing designated generally as 29. The rapid traverse motor 22 is, on the other hand, connected with the other terminal element or sun gear 30 of this differential gearing, whereas the driven lead screw 23 is connected to the spider 31 carrying planets 32 meshed with both the ring and sun gears. When idle the rapid traverse motor 22 is held against rotation by a normally engaged clasp brake 33 (see Fig. 1) so that the sun gear 30 is also held against rotation at such time. That being the case, if the feed motor 21 is operated with the rapid traverse motor 22 idle, the lead screw 23 is revolved slowly and the table 11 moved at a corresponding slow feed speed. When the rapid traverse motor 22 is running, however, the lead screw is revolved at a corresponding high speed for rapid motion of the table. Both of the motors 21 and 22 being reversible, the table can be moved at either a slow feed speed or at a fast rapid traverse speed in both directions. Motion of the table 11 toward the headstock 15 in Fig. 1 may be designated as "normal" and motion in the opposite direction as "reverse."

Pushbutton controls are desirably provided in a machine of the type illustrated in Fig. 1, and the machine there shown has been illustrated as equipped with a movable control panel or so-called pendant 34 suspended from a swinging arm 35. This pendant is of the same general form disclosed in William F. Ridgway Patent No. 2,224,106, issued December 3, 1940.

Nine pushbutton switches S1, S2, S3, S4, S7, S8, S9, S10 and S11, as well as a tumbler type selector switch S5, are provided. Their respective functions are indicated by the legends on the panel of Fig. 2. Thus the spindle motor 20 may be started by momentarily pushing the spindle "run" button S1 and stopped by momentarily pressing the spindle "stop" button S8. Similarly, the feed motor 21 may be sarted by momentarily pressing the feed "run" button S7 and stopped by momentarily pressing the corresponding "stop" button S9. The traverse motor 22, on the other hand, runs only so long as the button S4 is held depressed; and in much the same manner the feed motor 21 is caused to run at either a fast feeding rate or at a slow jogging rate so long as corresponding ones of the buttons S2 and S3 are held depressed. Throwing the selector switch S5 to one or the other of its "normal" or "reverse" positions conditions both the feed and rapid traverse motors 21, 22 for moving the table in a corresponding direction when such motors are subsequently operated. Pressing one or the other of the buttons S10, S11 serves, correspondingly, to increase or decrease the speed of the feed motor 21 by an amount corresponding to the length of time that such button is held depressed.

In accordance with the present invention an interlocking or safety arrangement is incorporated in the machine and which is of such character that pushing the "traverse" button S4 will normally be wholly ineffective to start the traverse motor 22 unless the direction selector S5 has been thrown to the opposite direction position from that which it occupied during the last preceding operation of the feed motor 21. In the event that the feed motor 21 has been operating to drive the table 11 in the "normal" or forward direction, then the "traverse" button S4 is rendered effective to start the traverse motor 22 only after the selector S5 has been thrown to its "reverse" position; or, conversely, if the feed motor has been operating to drive the table in its "reverse" direction, the selector S5 must be thrown to its "normal" position before the "traverse" button S4 can start the traverse motor.

For the purpose indicated above, a pair of interlock relays having actuating windings 1L, 2L are provided (see Fig. 3) and having respective contacts 1L1 and 2L1 in the energizing circuits of the actuating windings 5F, 5R of a pair of forward and reverse contactors for the rapid traverse motor 22. The relay 1L is thus adapted to disable the traverse motor against operation in a forward or "normal" direction whereas the relay 2L is adapted to disable the traverse motor against operation in the opposite or "reverse" direction. In general the arrangement is such that whenever the selector switch S5 is thrown to its "normal" position and the feed motor 21 then or subsequently operated in such direction, the relay 1L is energized and its contacts 1L1 reclosed only by throwing the selector S5 to its "reverse" position. Similarly, whenever the selector S5 is thrown to its "reverse" position and the feed motor 21 operated, the other interlock relay 2L opens its contacts 2L1 and only recloses them when the direction selector switch S5 is thrown to its opposite or "normal" position.

As to the particulars of the relay circuits for the purpose noted above, it will be observed in Fig. 3 that the relay winding 1L is in series with contacts 2F3 and 4F3 of relays having actuating windings 2F and 4F respectively, whereas the relay winding 2L is in series with contacts 8R3 and 4R3 of relays having actuating windings 8R and 4R respectively. Circuit for the relay actuating winding 4F is completed, to close the contacts 4F3, by throwing the direction selector switch S5 to its "normal" position, while the relay winding 2F is energized to close its contacts 2F3 when the feed motor 21 is energized for operation in a forward or "normal" direction, as will hereinafter appear in somewhat more detail. The interlock relay winding 1L is thus energized when the feed motor is started in a "normal" direction. Similarly, relay winding 4R is energized when the selector switch S5 is thrown to its "reverse" position, thereby closing contacts 4R3, whereas relay winding 8R is energized when the feed motor 21 is conditioned to operate in a "reverse" direction, thereby closing the contacts 8R3 and completing the energizing circuit for the other interlock relay winding 2L.

The armatures A1, A2 of the interlock relays 1L, 2L are latched in position to hold the respective contacts 1L1 and 2L1 open by spring-urged latches 35, 36. Consequently, when the winding 1L or 2L has once been energized its associated latched armature can only be released for restoration of the associated contacts to closed position by energizing the corresponding trip winding TF, TR. As shown, the trip winding TF is connected for energization through the selector switch S5 when the latter is thrown to its "reverse" position, and the trip winding TR is connected for energization through such selector switch when the latter is thrown to its "normal" position.

The purpose of providing latched armatures on the interlock relays is to preclude the possibility of failure of the interlock in the event that the power should go off, or be cut off, at sometime during the machine cycle. In the absence of such a latching arrangement, if one or the other of the interlock relay windings 1L or 2L were energized, and the power failed for any reason, its contacts 1L1 or 2L1 would reclose. As it is, such inadvertent reclosure is prevented by the mechanical latch arrangement employed so that positive tripping of the latches by the trip windings TF, TR is required.

Also included in the interlock set-up is a manually operable selector switch having mechanically connected, oppositely operating contacts S6, S6A. Normally this selector switch is positioned as shown with the contacts S6A closed and the contacts S6 open. In the event that the operator desires to condition the machine for so-called "jump" feeding" in which rapid traverse and feed motions of the table 11 alternate in sequence in the same direction of the table, the selector switch is thrown to close the contacts S6 and open the contacts S6A. Opening of the latter contacts open-circuits the interlock relay windings 1L, 2L and thus disables the interlocking system temporarily. However, the operator is warned of such disablement by having the selector switch S6, S6A located at some point remote from the pendant 34, as for example on a relay panel (not shown) for the machine. Moreover, even though opening of S6A does open-circuit the windings 1L, 2L, the corresponding relay armatures A1, A2 will remain latched, if they are so, until the selector S5 is thrown. This further required manipulation additionally warns the operator that he will thereafter be proceeding without the safety of the interlock.

Turning now to somewhat more of the detail of the remainder of the circuit with which the interlocking devices described above are associated, it will be seen upon reference to Fig. 3 that power for the rapid traverse motor 22 is derived from three phase alternating current supply lines L1, L2, L3 under the control of a pair of reversing contactors having actuating windings 5F, 5R and contacts 5F1, 5R1 which connect the motor for opposite directions of rotation, as well as a main contactor having an actuating winding 2M and contacts 2M1, 2M2. The brake 33 heretofore mentioned is adapted to be released whenever the traverse motor 22 is energized by coincident energization of a solenoid 33A connected across one phase of the supply to the motor. The spindle motor 20 and feed motor 21 are, on the other hand, shown as being direct current motors fed from direct current supply lines D1, D2 along with a number of their associated relays and contactors. The remainder of the control relays are energized by low voltage alternating current derived from lines L4, L5 by way of a step-down transformer T.

The spindle motor 20 has an armature 37, series field 38 and shunt field 39. The speed of this motor is controlled by a manually adjustable rheostat 40 in series with the shunt field and its direction is controlled by a manually operated selector switch S12. Since there is infrequent occasion to alter the direction of the spindle motor, the switch S12 need not be mounted on the pendant 34. The feed motor 21 is also shown as a compound motor, having in this instance an armature 41, a series field 42 and a shunt field 43. A rheostat 44 in series with the latter field serves to alter its speed. Such rheostat may be adjusted by a suitable motor operator (not shown) under the control of the pushbuttons S10, S11 in the general manner heretofore disclosed, for example, in William F. Ridgway Patent No. 2,224,106, issued December 3, 1940.

The starting and stopping of the several motors may next be considered. Turning first to the spindle motor 20, the same is started by momentarily closing the "spindle run" switch S1 on the pendant 34. This energizes the relay winding 1R causing contacts 1R1 to be momentarily closed, and thus energizes the contactor actuating winding 1M. The latter thereupon closes its contacts 1M1 and 1M2, the former serving to retain the winding 1M energized and the latter connecting the motor armature and series field 37, 38 across the supply lines D1, D2. To stop the spindle motor it is necessary only to depress the "spindle stop" button S8 momentarily, thereby energizing the relay winding 9R and thus opening the latter's contacts 9R1 to drop out the contactor 1M.

The spindle motor contactor 1M has an additional set of contacts 1M3 included in the control circuit for the feed motor 21 and which, in general, serves to prevent starting of the feed motor except when the spindle motor is running.

To initiate operation of the feed motor 21 the direction selector S5 is preliminarily thrown to the position corresponding to the desired direction of feed and the "feed run" button S7 momentarily depressed. This momentarily energizes the relay winding 6R so that the latter momentarily closes its contacts 6R1. The pair of relay windings 1F, 2F or the alternative pair 7R, 8R are thereupon energized, depending upon whether contacts 4F4 or 4R4 have previously been closed by the direction selector S5. Consequently the feed motor is connected across lines D1, D2 by contacts 1F2, 2F2 or 7R2, 8R2, depending upon the selected direction. Coincidentally, relay winding 1B is energized through contacts 7R1 or 1F1, as the case may be. Winding 1B closes its contacts 1B2 which act, in conjunction with the heretofore mentioned contacts 1M3 of the spindle motor contactor, to seal in the selected pair of relays 1F, 2F or 7R, 8R. Winding 1B also opens its contacts 1B1 to open-circuit the dynamic braking resistor 50.

The acceleration cycle of the feed motor 21 is controlled automatically through use of a time delay relay having an actuating winding 4T. Before starting, this winding is energized, being across lines D1, D2, so that its contacts 4T1 are closed and 4T2 open. As soon as the reversing relays are picked up, contacts 2F1 or 8F1, as the case may be, open, thereby open-circuiting 4T. The potential across the latter slowly decays by current leakage through a corresponding one of the resistors 45, 46 in series with condensers 47, 48. Accordingly, the contacts 4T2 close and contacts 4T1 open after a predetermined time interval. Closing of the contacts 4T2 energizes the relay actuating winding 1A so that the latter's contacts 1A1 close, shunting a resistor 49 which is in series with the motor armature 41. Opening of the contacts 4T1 cuts a resistor into the supply circuit for the reversing relays, only a low voltage being required to hold them in.

Also as a part of the acceleration cycle the rheostat 44 is cut out of circuit, so that full shunt field excitation is applied, until the motor comes up to speed. For that purpose a relay winding 1D is shunted across the armature 41 and closes its contacts 1D1 upon application of voltage to 1D. Thereupon a relay winding 2A is energized, closing its contacts 2A1 to shunt out the rheostat 44 at starting. After the starting interval, when relay winding 1A is energized, the latter opens its contacts 1A2 so that 2A is deenergized and opens its contacts 2A1 to render the rheostat 44 operative.

The feed motor 21 may be stopped either by momentarily depressing the "feed stop" button S9 or by throwing the direction selector S5. Closing of S9 energizes relay winding 10R, whereupon it opens its contacts 10R1 and drops out the one or the other of the pairs of relay windings 1F, 2F or 7R, 8R which have theretofore been energized for corresponding direction of feed motor rotation. Throwing the direction selector S5 similarly drops out 1F, 2F or 7R, 8R, as the case may be, through causing contacts 4F4 and 4R4 to be opened simultaneously as S5 is passing from "normal" to "reverse" position, or vice versa.

Turning now to the rapid traverse motor 22, it will be seen that its basic control circuit is of simple character. A main contactor having actuating winding 2M and contacts 2M2, together with reversing contactors having actuating windings 5F, 5R and contacts 5F1, 5R1, is employed in connecting and disconnecting the rapid traverse motor from its supply. In the absence of any interlocks all that would be required would be for appropriate ones of 5F, 5R to be energized in accordance with the setting of the direction selector S5 and for 2M to be energized and deenergized with the closing and opening of the "traverse" pushbutton switch S4. As heretofore noted, however, the present invention contemplates imposition of safety interlocking to disable the starting circuits for the rapid traverse motor 22 except when certain safety conditions have been fulfilled in reference to the correlated operation of the feed motor 21. Accordingly, consideration will next be given as to how the interlock devices heretofore identified operate under various sets of conditions.

First of all let it be assumed that the selector S6, S6A is in the position shown (Fig. 3), conditioning the interlocks for normal operation. Moreover, let it be assumed that the table 11 is being advanced in a forward or "normal" direction by the feed motor 21 and the tools making a bore in the work piece 10. Under such circumstances, the operator will wish to halt the feed when the bore is completed and restore the table to starting position at a rapid traverse rate. To stop the feed motor 21, he momentarily closes the "feed stop" switch S9, thereby deenergizing the relay winding 1F, 2F as heretofore described and stopping the feed motor. At that time the direction selector switch S5 is still in its "normal" position, wherefore the relay winding 4F is energized and contacts 4F1 and 4F3 closed. On the other hand, 4R is deenergized so that contacts 4R1 and 4R3 are open. Moreover, the interlock relay armature A1 is latched in so that contacts 1L1 are open. Such being the case if the operator should close the "traverse" button S4, the traverse motor 22 will not start. It will not do so because even though closing S4 energizes relay winding 8R, causing the latter to close its contacts 8R1 and thus energize the main contactor winding 2M, nevertheless the circuits to the motor are open at both 4R1 and 1L1. The operator is thus saved from the consequences of his own carelessness for he cannot restart the machine in rapid traverse in the same direction in which it was previously feeding.

To render the rapid traverse motor operative the operator must throw the direction selector S5 to the position opposite that which it had during feed. In the circumstances assumed above that would be from "normal" to "reverse." That accords, of course, with his assumed intention of running the table back to starting position after boring was completed. Such shift of S5 drops out 4F and energizes 4R. The latter closes contacts 4R1, thereby conditioning the relay 8R. The trip coil TF is also energized, unlatching A1 preparatory to the next succeeding cycle of operation. Contacts 4R1 now being closed, closure of the "traverse" button S4 results in starting of the motor 22, for 8R closes its contacts 8R1 and they pick up 2M and 5R which completes the motor circuit.

Should the operator wish to do so, he may as heretofore described, stop the feed motor 21 by throwing the direction selector S5. This same shift of S5 also conditions the traverse motor circuits for operation in the manner just described.

It will be understood that if the feed motor is running in a "reverse" direction that throwing of the direction selector S5 to its opposite or "normal" position is again a condition precedent to starting the rapid traverse motor, this time it being necessary to energize 5F.

In the event that the "traverse" pushbutton switch S4 is closed either deliberately or inadvertently at any time while the feed motor is actually running, the traverse motor will not start. Such disablement is accomplished by placing contacts 1F3 and 7R3 in series with S4. Consequently, both the forward and reverse relay windings 1F, 7R for the feed motor must be deenergized in order for contacts 1F3 and 7R3 to both be closed and complete the circuit through S4.

From the foregoing it will be seen that the circuits are completely interlocked to prevent an operator from carelessly initiating rapid traverse in a previous direction of feed when he, in fact, intended to rapidly withdraw the work from the tool in a direction opposite to that of the previous feed.

When boring a series of spaced axially aligned holes one after another it is desirable to use so-called "jump" feeding. In that case rapid traverse and slow feed speeds are alternated in the same direction, the boring of each hole at slow feed speed being followed by a rapid traverse advance to the next hole in the series. To make it possible to accommodate that special condition, provision has been made for disabling the interlocking arrangement. It is for that purpose that the selector S6, S6A is provided.

In the event that the selector S6, S6A is thrown to disable the interlock, the contacts S6 are closed and S6A opened. Closing S6 shunts the contacts IF3, 7R3 so that the traverse motor 22 can be operated even when the feed motor 21 is running. That is done since in a jump feed cycle it is convenient to let the feed motor run all of the time and cut the traverse motor in and out to differentiate between the sequential periods of rapid traverse and feed. On the other hand, opening of S6A opens the circuits of the interlock relay windings IL, 2L so that they cannot thereafter pull their associated armatures a1, a2 into latched position. However, one or the other of these armatures will be latched in when S6A is opened and opening of the latter will not unlatch it. Throwing of the direction selector S5 is requisite for that. This necessity of operating both S5 and S6, S6A as a preliminary to jump feeding, plus location of S6, S6A at a reasonably inconvenient spot remote from the pendant 34, forcibly calls the operator's attention to the fact that he is disabling the safety interlocks and will not thereafter have their protection. To restore the interlocks to operation he has only to throw S6, S6A.

I claim as my invention:

1. In a drive mechanism for a machine tool element or the like and including first and second reversible electric motors for driving such element at a rapid traverse speed and at a slow feed speed respectively, the combination of means including a single manually operable direction selector switch for preliminarily conditioning both of said motors for rotation in a corresponding direction, individually operable starting devices for initiating operation of respective ones of said motors in a direction determined by the preliminary setting of said selector switch, and interlock means for preventing initiation of operation of said first motor by its starting device following an operation of said second motor until said direction selector has been shifted to the direction position therefor opposite to that which it occupied during such preceding operation of said second motor.

2. In a drive mechanism for a machine tool element or the like including first and second reversible electric motors for driving such element at a rapid traverse speed and at a slow feed speed respectively, the combination of means including a single manually operable direction selector switch shiftable between alternatively available forward and reverse positions for preliminarily conditioning both of said motors for operation in a corresponding direction, individually operable starting devices for initiating operation of respective ones of said motors in a direction determined by the preliminary setting of said selector switch, means including a pair of interlock relays for disabling said first motor against operation in a forward direction when one of said relays is energized and against operation in a reverse direction when the other of said relays is energized, means operable in response to initiation of operation of said second motor in a forward direction for energizing said one relay and in response to initiation of operation of said second motor in a reverse direction for energizing said other relay, and means operable in response to shift of said selector switch from forward to reverse position for dropping out said one relay and in response to shift of said selector switch from reverse to forward position for dropping out said other relay.

3. In a drive mechanism for a machine tool element or the like including first and second reversible electric motors for driving such element at a rapid traverse speed and at a slow feed speed respectively, the combination of means including a single manually operable direction selector switch shiftable between alternatively available forward and reverse positions for preliminarily conditioning both of said motors for operation in a corresponding direction, individually operable starting devices for initiating operation of respective ones of said motors in a direction determined by the preliminary setting of said selector switch, a pair of interlock relays each having a pair of normally closed contacts and with the latter connected respectively in forward and reverse rotation energizing circuits for said first motor, whereby such circuits are opened by said contacts when the corresponding relay is energized, means for releasably latching said contacts in open position, means operable in response to energization of said second motor for forward rotation for energizing the one of said relays having its contacts in the forward rotation circuit of said first motor and for energizing the other relay in response to energization of said second motor for reverse rotation, and means operable in response to shift of said selector switch from forward to reverse position and vice versa for unlatching the contacts of corresponding ones of said relays.

4. In a drive mechanism for a machine tool element or the like including first and second reversible electric motors for driving such element at a rapid traverse speed and at a slow feed speed respectively, the combination of alternatively energizable forward and reverse rotation circuits for each of said motors, a pair of interlock relays each having an actuating winding and a pair of normally closed contacts, such contacts being interposed in the forward and reverse circuits respectively for said first motor, whereby the latter is disabled against forward rotation when one relay is energized and against reverse rotation when the other is energized, and means for energizing said one relay in response to energization of the forward rotation circuit for said second motor and for energizing said other relay in response to energization of the reverse rotation circuit for said second motor.

5. In a drive mechanism for a machine tool element or the like including first and second reversible electric motors for driving such element at a rapid traverse speed and at a slow feed speed respectively, the combination of alternatively energizable forward and reverse rotation circuits for each of said motors, a pair of interlock relays each having an actuating winding and a pair of normally closed contacts, such contacts being interposed in the forward and reverse circuits respectively for said first motor, whereby the latter is disabled against forward rotation when one relay is energized and against reverse rotation when the other is energized, means for releasably latching said relay contacts in open position, means for energizing said one relay in response to energization of the forward rotation circuit for said second motor and for energizing said other relay in response to energization of the reverse rotation circuit for said second motor, a direction selector switch for said second motor, and means operable by said selector switch for releasing said latching means.

6. In a drive mechanism for a machine tool element or the like, the combination of a reversible power actuating mechanism operable selectively at either of two speeds, a manually operable direction selector, manually operable high and low speed starting devices, means operable in response to actuation of said low speed starting device for initiating operation of said power actuating mechanism at the lower of its two speeds in a direction corresponding to the setting of said direction selector and for simultaneously disabling said high speed starting device against initiating high speed operation of said power actuating mechanism in that same direction, means for terminating the operation of said power actuating mechanism initiated by said low speed starting device, and means operable in response to shift of said direction selector to a position therefor opposite that which it occupied during the last preceding operation of said power actuated mechanism at low speed for conditioning said power actuated mechanism for starting by said high speed starting device.

7. In a drive mechanism for a machine tool element or the like, the combination with a reversible power actuating mechanism operable selectively at either of two speeds, of interlock means for preventing initiation of operation of said mechanism at the higher of said two speeds except after reversal of said mechanism following the last previous operation of said mechanism at the lower of said two speeds.

8. In a drive mechanism for a machine tool element or the like and including first and second reversible electric motors for driving such element at a rapid traverse speed and at a slow feed speed respectively, the combination of means including a pair of electromagnetically actuated contactors for alternatively connecting said first motor for forward and reverse rotation, means including a pair of interlock relays for disabling respective ones of said contactors against operation upon energization of a corresponding one of said relays, and means operable in response to energization of said second motor for energizing one or the other of said relays in accordance with the direction of rotation of said second motor to disable the corresponding contactor from starting the first motor in the same direction as that in which the second motor is operating.

9. In a drive mechanism for a machine tool element or the like and including first and second reversible electric motors for driving such element at a rapid traverse speed and at a slow feed speed respectively, the combination of means for establishing alternatively available forward and reverse rotation energizing circuits for said first motor, means for establishing alternatively available forward and reverse rotation energizing circuits for said second motor, and means operable as an incident to operation of the second-mentioned means in establishing a circuit for rotation of said second motor in a selected direction for disabling said first-mentioned means from establishing a circuit for rotation of the first motor in that same direction.

10. In a drive mechanism for a machine tool element or the like and including first and second reversible electric motors for driving such element at a rapid traverse speed and at a slow feed speed respectively, the combination of means including a pair of contactors having individual actuating windings and operable upon energization of respective ones of said windings for establishing connections for rotation of said first motor in corresponding opposite directions, means including a manually operable direction selector switch shiftable between forward and reverse positions for setting up energizing circuits for said second motor for rotation in a direction corresponding to the position of said selector switch, a pair of interlock relays each having an actuating winding operable when energized to open a set of contacts in series with a corresponding one of said contactor actuator windings, and means operable upon energization of said second motor for energizing the one of said relays having contacts in series with the one of said contactor windings corresponding to the direction of rotation of said second motor incident to such energization thereof, whereby to disable such contactor against starting the first motor in the same direction as that in which said second motor is running.

11. In a drive mechanism for a machine tool element or the like and including first and second reversible electric motors for driving such element at a rapid traverse speed and at a slow feed speed respectively, the combination of means including a pair of contactors having individual actuating windings and operable upon energization of respective ones of said windings for establishing connections for rotation of said first motor in corresponding opposite directions, means including a manually operable direction selector switch shiftable between forward and reverse positions for setting up energizing circuits for said second motor for rotation in a direction corresponding to the position of said selector switch, a pair of interlock relays each having an actuating winding operable when energized to open a set of contacts in series with a corresponding one of said contactor actuator windings, means operable upon energization of said second motor for energizing the one of said relays having contacts in series with the one of said contactor windings corresponding to the direction of rotation of said second motor incident to such energization thereof, whereby to disable such contactor against starting the first motor in the same direction as that in which said second motor is running, latch means for releasably holding said interlock relay contacts open, and means operable in response to a shift of said selector switch for not only stopping said second motor but for also disengaging said latch means for the interlock contacts opened as an incident to institution of the operation of said second motor.

12. In a drive mechanism embodying a plurality of reversible electric motors for driving a machine tool element or the like at different speeds, the combination of manually operable switches grouped together for starting and stopping individual ones of said motors and also including a single direction selector switch for controlling the direction of rotation of a plurality of said motors, interlock means for compelling alternation in the direction of operation of the motors controlled by said selector switch, and means including a switch located remotely from said group of switches for disabling said interlock means.

WILLIAM F. RIDGWAY.

REFERENCES CITED

The following references are of record in the file of this patent:

UNITED STATES PATENTS

| Number | Name | Date |
|---|---|---|
| 2,330,489 | Heart et al. | Sept. 28, 1943 |
| 2,238,614 | Williams et al. | Apr. 15, 1941 |
| 1,781,792 | Rodman | Nov. 18, 1930 |